(12) United States Patent
Srinivas et al.

(10) Patent No.: US 8,185,145 B1
(45) Date of Patent: May 22, 2012

(54) DYNAMIC OVERHEAD CHANNEL POWER CONTROL

(75) Inventors: Shilpa Kowdley Srinivas, Herndon, VA (US); Hemanth Balaji Pawar, Herndon, VA (US); Anoop K. Goyal, Overland Park, KS (US); John W. Prock, Peculiar, MO (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 401 days.

(21) Appl. No.: 12/468,575

(22) Filed: May 19, 2009

(51) Int. Cl.
*H04B 7/00* (2006.01)
(52) U.S. Cl. .......................... 455/522; 455/68
(58) Field of Classification Search .................. 455/522, 455/68, 69, 441, 453
See application file for complete search history.

(56) References Cited

U.S. PATENT DOCUMENTS

| | | | |
|---|---|---|---|
| 7,437,176 B1 * | 10/2008 | Ribas et al. | 455/522 |
| 7,505,439 B2 * | 3/2009 | Chiang et al. | 370/335 |
| 7,724,656 B2 * | 5/2010 | Sagfors et al. | 370/229 |
| 7,945,281 B1 * | 5/2011 | Sigg et al. | 455/522 |

* cited by examiner

*Primary Examiner* — Brian Young

(57) ABSTRACT

Disclosed herein are methods and systems for dynamically adjusting power allocated for overhead communications in a sector of a radio access network (RAN). An exemplary method involves (a) detecting a switch to RC4 for resource allocation in a given sector; (b) in response to detecting the switch to RC4: (i) determining the location of each access terminal located in the sector; and (ii) based at least in part on the locations of the access terminals, determining mobility of access terminals in the sector; (c) making a determination as to whether or not the mobility is below a threshold level; and (d) if the determined mobility is below the threshold level, then: (i) based at least in part on the determined locations of the access terminals, determining an amount by which to reduce the power allocated for overhead communications in the sector; and (ii) reducing the power by the determined amount.

18 Claims, 8 Drawing Sheets

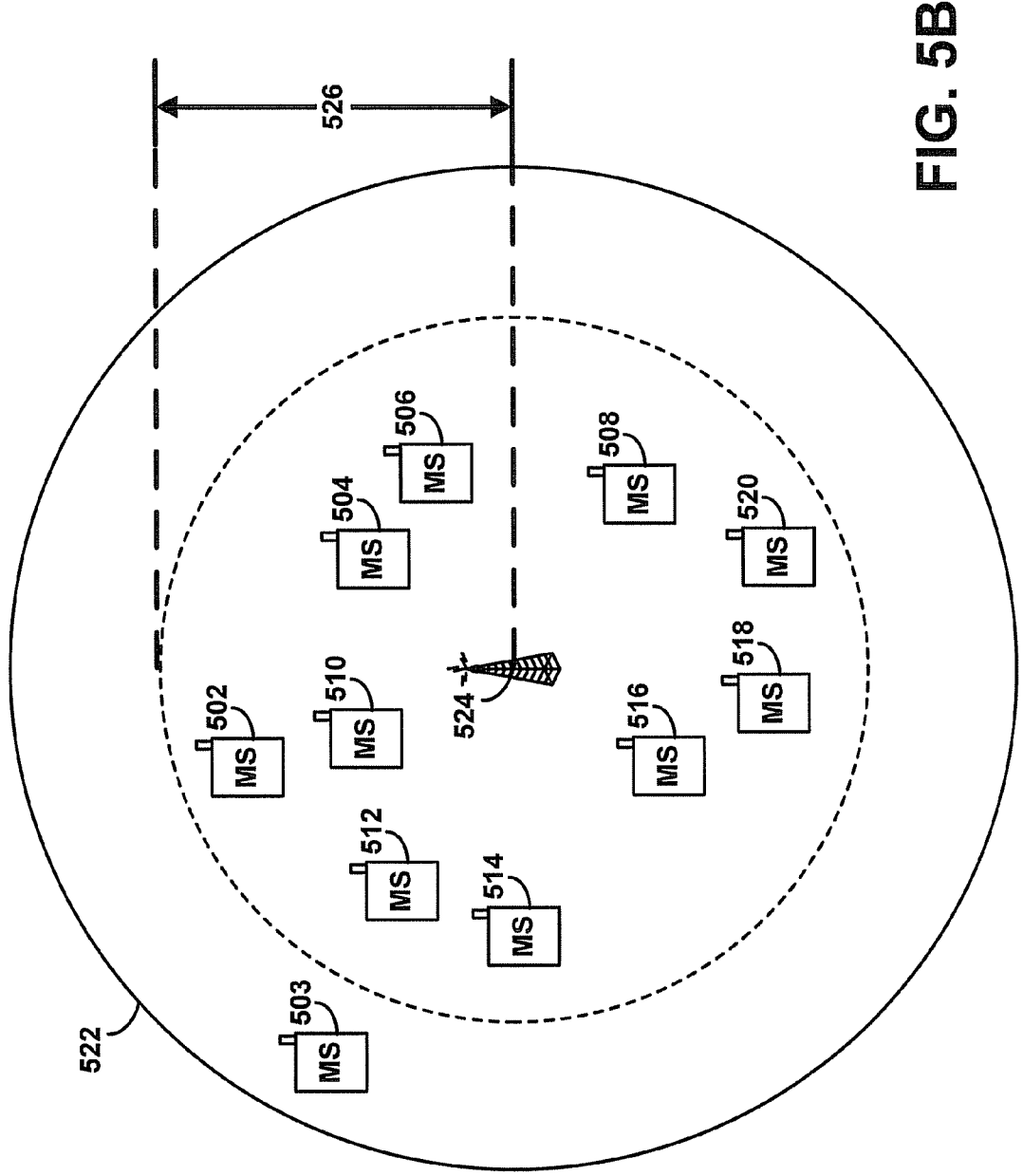

DYNAMIC OVERHEAD CHANNEL POWER CONTROL

BACKGROUND

Cellular wireless is an increasingly popular means of personal communication in the modern world. People are using cellular wireless networks for the exchange of voice and data over cellular telephones, Personal Digital Assistants ("PDAs"), cellular modems, and other mobile stations. In principle, a user can seek information over the Internet or call anyone over a Public Switched Telephone Network ("PSTN") from any place within coverage of the cellular wireless network.

A typical cellular wireless system includes a number of base stations that radiate to define wireless coverage areas, such as cells and cell sectors, in which mobile stations can operate. In turn, each base station is typically coupled with equipment that provides connectivity with one or more transport networks, such as the public switched telephone network (PSTN) and/or the Internet for instance. With this arrangement, a mobile station operating within a coverage area of any base station can engage in air interface communication with the base station and can thereby communicate via the base station with various remote network entities.

In practice, communications over the air interface between a base station and a mobile station are structured in accordance with a particular air interface protocol or "access technology." Numerous such protocols are well known in the art, and others will be developed in the future. Examples of existing protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth. Each protocol may define its own procedures for initiation of calls, handoff between coverage areas, and functions related to air interface communication.

Further, each base station in a cellular wireless system has various air interface resources that the base station can allocate for use to serve mobile stations operating in its coverage area(s). For example, in each coverage area, the base station may have a limited amount of transmission power (e.g., a maximum power level of the base station's power amplifier), and the base station may need to allocate that power among concurrent communications with mobile stations. As another example, in each coverage area, the base station may have a limited frequency spectrum, and the base station may need to allocate portions of that spectrum among concurrent communications with mobile stations. And as still another example, in each coverage area, the base station may have a limited supply of codes to use for encoding air interface communications, and the base station may need to divvy those codes among concurrent communications as well.

As a specific example, each coverage area in a spread spectrum system uses orthogonal spreading codes to uniquely define communication channels on the air interface, and in order to preserve distinctions (orthogonality) between the codes, a limited number of such codes exists. Each sector or other coverage area of a CDMA spread spectrum system, for instance, has a limited set of Walsh codes that are used to define various air interface channels. Typically, a small number of those Walsh codes are reserved for use to encode overhead control channels, while the remainder of the Walsh codes are assigned on an as-needed basis to encode bearer traffic channels for voice or data calls.

As each sector has a limited number of Walsh codes, each sector can support a limited number of concurrent calls. Furthermore, this limitation becomes more complex because most CDMA systems allow for multiple types of air interface encoding, with each type consuming a different amount of spreading resources as well as a different amount of total available base station power.

Under the well known CDMA2000 standard, for instance, at least two different "radio configurations" are defined— "RC3" and "RC4". RC3 is typically used for voice calls, and RC4 is typically used for data calls, however a base station may generally select either configuration for a given call. Each of these radio configurations uses different length Walsh codes that provide different amounts of spreading, and each radio configuration tends to consume a different amount of base station power. In particular, each RC3 call uses a 64-bit Walsh code that provides more spreading and consumes less base station power, while each RC4 call uses a 128-bit Walsh code that provides less spreading and consumes more base station power. In terms of orthogonal coding resources available in a given sector, each 128-bit Walsh code uses about one half the resources of a 64-bit Walsh code. As a result, a given sector can generally support (i) a particular number of RC3 calls, (ii) twice as many RC4 calls, (iii) or some combination of RC3 calls and RC4 calls. (Additional radio configurations may be available as well, which may further increase complexity.)

OVERVIEW

When a cellular wireless system sets up a call for a mobile station in a given coverage area (or when a call is being handed off into the coverage area), the system may need to select a type of resource-allocation to use for the call. For example, the system may have various types of resources or various types of a given resource, and the system may need to select which type of resource to allocate for the call. And as another example, the system may have various procedures or mechanisms for allocating resources, and the system may need to select which procedure or mechanism to use for allocating resources for the call.

As a specific example, a system that has different radio configurations may need to decide which radio configuration to use for the call, taking into consideration various resource limitations of the system. In CDMA, for instance, the system may need to decide whether to use RC3 or RC4, and thus whether to use a 64-bit Walsh code for the call (thereby consuming more spreading resources and less base station power) or a 128-bit Walsh code for the call (thereby consuming less spreading resources and more base station power). The decision of whether to use RC3 or RC4 can be made based on factors including (i) whether the call is a voice call or a data call, (ii) how many Walsh codes (or spreading resources) are left in the sector, and (iii) how much power is left in the sector.

For a given sector, a base station may be configured to assign RC3 to a certain percentage of calls and RC4 to a certain percentage of calls, or to use RC3 to assign Walsh codes until a threshold occupancy is reached (e.g., until a threshold number of Walsh codes are in use or a threshold amount of the total available power in the sector is in use), at which point new calls may be assigned Walsh codes using RC4. RC4 provides more Walsh codes for new connections— 128 in total as compared to the 64 provided by RC3—but also uses more power than RC3.

Typically, a base station allocates a certain amount of power from the total available power in a sector for transmitting user traffic (e.g., for traffic channels), and a certain amount for transmitting overhead communications (e.g., for overhead channels). When a base station is using RC4 and encounters the scenario where there is not enough power left for additional user traffic, mobile stations requesting to connect may be blocked or denied, or alternatively, the base station may provide the requested connection, but assign a Walsh code using RC3. Both of these actions may result in RC4's capabilities being underutilized, since the available power is preventing use of Walsh codes that would otherwise be available. Accordingly, methods and systems are provided for dynamically adjusting power allocated to overhead channels (e.g., pilot, page, and sync channels), so that more power is available for RC4 communications in the traffic channel.

In one aspect, an exemplary method for dynamically adjusting power allocated for overhead communications in a radio access network (RAN) is disclosed. The method involves (i) detecting that a particular radio configuration is available for use in a given sector of the RAN, wherein an amount of initially power is allocated for overhead communications in the sector; and (ii) in response to detecting that the particular radio configuration is available for use: (a) determining the location of each or one or more access terminals located in the sector; (b) using the determined locations of the access terminals as a basis for determining an amount by which to reduce the power allocated for overhead communications in the sector; and (c) reducing the power allocated for overhead communications by the determined amount.

In another aspect, another exemplary method for dynamically adjusting power allocated for overhead communications in a radio access network (RAN) is disclosed. The method involves (i) detecting a switch to RC4 for resource allocation in a given sector of the RAN, wherein an amount of power is initially allocated for overhead communications in the sector; (ii) in response to detecting the switch to RC4: (a) determining the location of each or one or more access terminals located in the sector; (b) based at least in part on the determined locations of the access terminals, determining mobility of access terminals in a given sector of the RAN; (c) making a determination as to whether or not the determined mobility of access terminals in the sector is below a threshold level; (iii) if the determined mobility is below the threshold level, then (a) determining an amount by which to reduce the power allocated for overhead communications in the sector; and (b) reducing the power allocated for overhead communications by the determined amount; and (iv) if the determined mobility is not below the threshold level, then refraining from reducing the power allocated for overhead communications.

In another aspect, a system configured to dynamically adjust power allocated for overhead communications is disclosed. Preferably the system is implemented in a RAN. The system comprises: (i) a communication interface; (ii) at least one processor; and (iii) program logic stored in data storage and executable by the at least one processor to: (a) operate the communication interface; (b) detect that a particular radio configuration is available for use in a given sector of the RAN, wherein an amount of power is initially allocated for overhead communications in the sector; (c) when the particular radio configuration is detected as available for use, determine the location of each or one or more access terminals located in the sector; (d) use the determined locations of the access terminals in the sector as a basis to determine an amount by which to reduce the power allocated for overhead communications in the sector; and (e) reduce the power allocated for overhead communications by the determined amount.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 5B is another block diagram illustrating an exemplary scenario in which an exemplary embodiment may be employed.

DETAILED DESCRIPTION

For illustration, the present method will be described with respect to CDMA communications and particularly with respect to reducing power allocated to overhead channels when a particular radio configuration such as RC4 is in use, thereby allowing additional power to be allocated to traffic channels. It should be understood, however, that the method could apply equally with respect to other air interface protocols, other types of resource-allocation, other types of resource-availability, and other types of wireless coverage areas. Other variations are possible as well.

Figure 1:
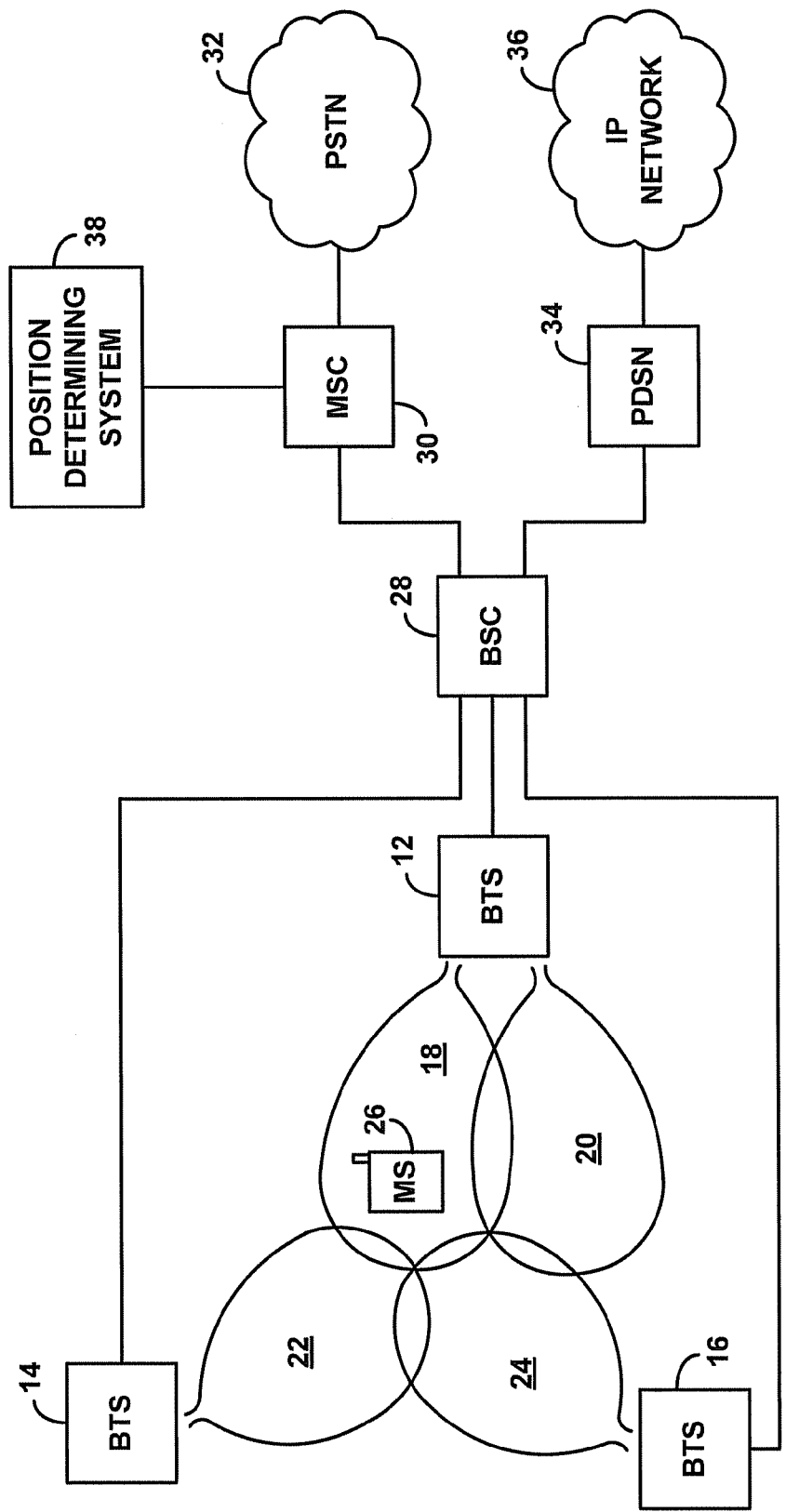
FIG. 1 is a simplified block diagram of a communication system, according to an exemplary embodiment.

Referring to the drawings, FIG. 1 is a simplified block diagram of an exemplary communication system in which the present method can be implemented. The communication system may take the form, in whole or in part, of a radio access network (RAN) configured to provide wireless service to mobile stations operating within its coverage area. As shown, the system includes a plurality of base transceiver stations (BTSs) 12, 14, 16, each radiating to define one or more sectors. In particular, the figure depicts BTS 12 radiating to define at least two sectors 18, 20, BTS 14 radiating to define at least one sector 22, and BTS 16 radiating to define at least one sector 24. Shown operating within the coverage of sector 18 (served by BTS 12) is a representative mobile station (i.e., wireless communication device, whether fixed in position or movable) 26. Numerous mobile stations may be operating concurrently in the various sectors shown. However, for simplicity, only one mobile station is shown.

All three BTSs 12, 14, 16 are shown coupled with a base station controller (BSC) 28, which functions to control various BTS operations as well as aspects of air interface operation, such as handoff of calls between BTS sectors. (In an alternative embodiment, the BTSs may be served by different BSCs or may incorporate BSC-like functionality; other arrangements are possible as well.) BSC 28 is then coupled with a mobile switching center (MSC) 30, which provides connectivity with the public switched telephone network (PSTN) 32, and BSC 28 is further coupled with a packet data serving node (PDSN) 34, which provides connectivity with a packet-switched network 36, such as the Internet for instance. In addition, MSC 30 is coupled with a position determining system 38, which operates in a known manner to facilitate determining the location (e.g., GPS coordinates, or a more coarse location) of a mobile station served by the system. Position determining system 38 may also be accessible via packet-switched network 36.

In a preferred embodiment, an exemplary method may be implemented at a BTS, at a BSC, and/or at any other component of the system. For instance, the method may be implemented by BTS 12, BSC 28, and/or MSC 30. Similarly, an exemplary system may take the form of a BTS, a BSC, and/or any other component of the system. Each such component, as well as other network components in the system, may include a processor (e.g., one or more general purpose processors and/or dedicated processors), data storage (e.g., one or more volatile and/or non-volatile storage components) containing program logic executable by the processor to carry out functions described herein, and a network connection mechanism to facilitate communication with other components of the system. Alternatively, an exemplary method may be implemented at least in part by other entities and/or by other types of logic (such as hardware logic for instance). Other implementation mechanisms are possible as well.

Communication between the system and mobile stations may take the form of a voice call (e.g., a call placed over PSTN 32), a data call (e.g., a wireless packet data session (e.g., for HTTP, SIP, VoIP, media streaming, etc.), often referred to as a "call"), or some other type of call that will use air interface traffic channel resources in the sector. The manner in which the call is initiated in the sector can vary depending on the type of call (e.g., voice or data), the version of air interface protocol being used, and/or other factors. For instance, if the call is a voice call, MSC 30 may then work to set up the call via PSTN 32 to the called party. On the other hand, if the call is a data call, BSC 28 may signal to PDSN 34, to trigger establishment of a data link layer connection between PDSN 34 and mobile station 26, and assignment of a mobile-IP address to allow mobile station 26 to communicate on packet-switched network 36.

By way of example, under CDMA2000, mobile station 26 may originate a call (voice or data) by transmitting an origination message on an air interface access channel to BTS 12, providing in the origination message a service option code that designates whether the call is a voice call or a data call. Upon receipt of the origination message, BTS 12 would signal to BSC 28, and BSC 28 would in turn signal to MSC 30. Further, when MSC 30 receives a signaling message requesting establishment of a voice call to mobile station 26, MSC 30 may instruct BSC 28 to page mobile station 26, and BSC 28 may direct BTS 12 to assign an air interface traffic channel for the call, with BSC 28 and/or BTS 12 deciding whether to use RC3 or RC4 for the call. Similarly, if BSC 28 receives packet data destined to mobile station 26 at a time when mobile station 26 does not have an air interface traffic channel (i.e., when mobile station 26 is dormant), BSC 28 may page the mobile station and assign a traffic channel, again with BSC 28 and/or BTS 12 deciding whether to use RC3 or RC4 for the call.

According to an exemplary embodiment, a RAN (and in particular a BTS and/or BSC) may be configured to allocate resources for a call in accordance with a selected type of resource-allocation. In the arrangement of FIG. 1, for instance, the method can be implemented by BTS 12 and/or BSC 28 to select between RC3 and RC4 for a call that is being set up to or from mobile station 26 in sector 18. In accordance with the selection, the system (e.g., BTS 12 and/or BSC 28) can then assign a Walsh code to be used for the call. In particular, if the system selects RC3, then the system may assign a 64-bit Walsh code to be used for the call, and if the system selects RC4, then the system may assign a 128-bit Walsh code to be used for the call. The system may assign additional Walsh codes or other resources for use in connection with the call as well. BTS 12 would then transmit an enhanced channel assignment message (ECAM) on an air interface paging channel to mobile station, informing the mobile station what Walsh code to use for the call.

BTS 12 may be configured to use various techniques to select between RC3 and RC4 for new calls and/or for calls being handed off to the BTS. For instance, the BTS 12 may be configured to use RC4 for only a certain percentage of calls, such as ten percent of the calls. Accordingly, BTS 12 may use RC4 for every tenth call it sets up, or may use RC3 until approximately ninety percent of its resources are in use, and then switch to use of RC4, among other techniques. A BTS may further be configured to maintain data indicating the number of mobile stations that are using RC3 in a given sector, and the number of mobile stations that are using RC4 in a given sector. Alternatively, this data may be stored in a BSC or another entity (in which case the BTS may be configured to query the storing entity for this data).

As noted above, FIG. 1 also depicts a position determining system 38 in communication with MSC 30. Position determining system 38 may function or assist in determining the geographic position coordinates of a given mobile station such as mobile station 26. Applying industry standards, for instance, position determining system 38 may cause mobile station 26 to measure phase delays of pilot signals that mobile station 26 receives from various base stations and to report those measurements to position determining system 38. Position determining system 38 may then use those measurements to approximate the location of mobile station and may report that location to a querying entity. In addition, if a more precise indication of location is desired, position determining system 38 may use the approximated location of the mobile station to identify GPS satellites that should be the sky over the mobile station 26, and position determining system 38 may then direct the mobile station to record and report information regarding signals it receives from those satellites. Using that information, the position determining system may then more accurately determine the geographic coordinates (e.g., GPS coordinates) of the mobile station and likewise report the determined location to a querying entity. It should be understood that any technique for mobile-station location may be used, without departing from the scope of the invention.

Through communication with position determining system 38, a network component such as BTS 12 and/or BSC 28 can thus determine the location (e.g., GPS coordinates) of the mobile station 26. Alternatively, mobile station 26 may itself be able to determine its GPS coordinates in much the same way that conventional handheld navigation units do, or mobile station 26 may be able to determine its location through communication with position determining system 38. Mobile station 26 may then report its determined location to the BTS 12, and BSC 28, within a call origination message or page response message for instance, to enable BTS 12, BSC 28, and/or another entity to use the location in the context of the present method.

To provide the data used by a mobile station to set up and maintain a connection (i.e., a call), a BTS may provide what are referred to as "overhead channels" via which it transmits overhead information, which enables mobile stations to operate according to the parameters of a sector. In general, a transmission of overhead information may be referred to generally as an "overhead communication." In a CDMA sector, the overhead channels typically include the pilot, sync, and paging channels, among others.

The mobile station typically decodes the overhead information (received via the overhead channels) to identify a set of data that uniquely identifies the transmitting BTS, which is likely the BTS closest to where the mobile station is currently operating. This set of base-station-identifying data may include a PN offset, a coverage-area (e.g. cell or sector) identifier (ID), and a switch (e.g. mobile switching center (MSC)) ID. To use overhead information to connect to a RAN, a mobile station may be equipped with an internal network receiver (e.g. chipset), which it uses to scan overhead channels such as pilot, paging, and sync channels, and identify the strongest CMDA carrier (or more generally, the strongest network signal, such as a pilot signal).

The amount of power a BTS allocates for overhead communications may define the size of a sector, at least in part. In particular, while it is typical that a sector is organically shaped (due to factors such as interference, terrain, landscape, etc.), the size of a sector may generally be related to the reach of service from the serving BTS (i.e., the average distance from the serving BTS at which communications can take place). More specifically, each BTS may have an associated "link budget," which includes parameters that may be used to define a sector size. In particular, the link budget may include parameters defining the power allocated for pilot, page and synch channels. Accordingly, sector size may be adjusted by varying the overhead channel power levels specified in the link budget. Service is generally not available to a mobile station unless a pilot signal (and possibly other signaling providing overhead information) is available, and the range of a pilot signal from a BTS is generally a function of the power available to transmit the pilot signal (e.g., the power allocated to the pilot channel and/or other overhead channels). Accordingly, reducing power allocated for overhead channels, such as the pilot channel, may effectively reduce the size of a sector (i.e., the size of the geographic area of the sector). Likewise increasing the power allocated for overhead channels, may effectively increase the size of a sector.

Since the BTS typically has a limited amount of total power that it can use for all transmissions, there is a tradeoff when more or less power is allocated for overhead communications. Specifically, while reducing the amount of power allocated for overhead channels may free up additional power to transmit traffic data via traffic channels, reducing the power allocated to overhead channels may effectively reduce the size of a sector (i.e., the geographic area in which the sector provides service). Accordingly, an exemplary method and system may be used to provide additional power for traffic data by redistributing power from overhead channels to traffic channels (or possibly elsewhere) in such a manner that the size of the sector is not reduced so much as to exclude mobile stations with existing connections.

Figure 2:
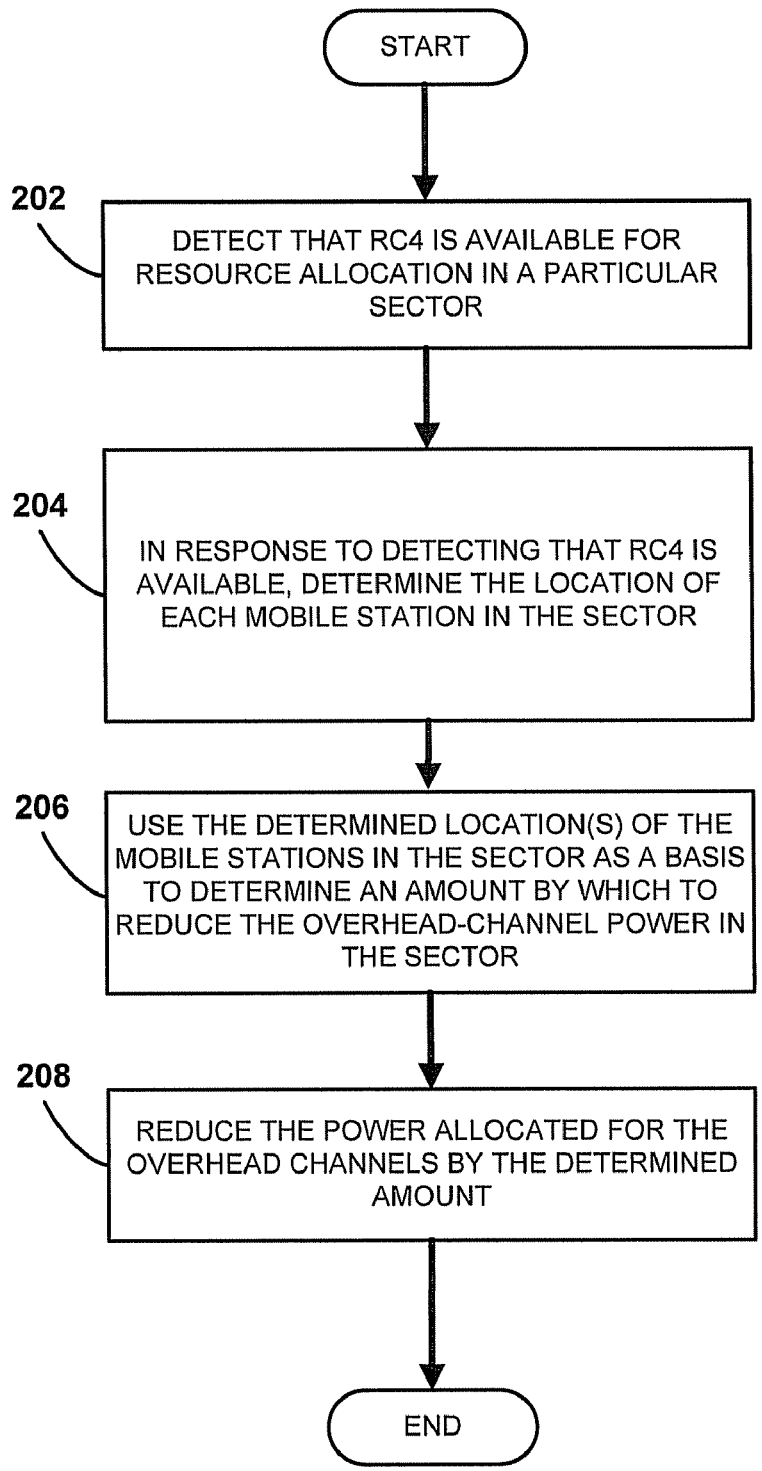
FIG. 2 is a flow chart illustrating a method for dynamically adjusting power allocated for overhead communications, according to an exemplary embodiment.

FIG. 2 is a flow chart illustrating a method for dynamically adjusting power allocated for overhead communications, according to an exemplary embodiment. The method is typically carried out in a RAN, and is described by way of example as being carried out by a BTS that implements the method in order to adjust the power allocated to its overhead channels. In particular, the BTS may use the method to redistribute power from one or more overhead channels in a sector it serves to one or more traffic channels in the sector. Accordingly, the method may be particularly useful to accommodate the additional traffic channels provided when RC4 is being used for resource allocation. Thus, in an exemplary embodiment, the method may be triggered whenever a BTS switches from RC3 to RC4 as the radio configuration for new calls, or whenever a process that selects between RC3 and RC4 for new calls (referred to as an "RC3/4 selection process") is initiated. However, it should be understood that the method may be implemented in other scenarios as well.

Herein, when a given a sector size is calculated, used in a calculation, or the sector is adjusted to be a certain size, this may be accomplished by using path loss as a proxy for sector size. Specifically, a median path loss for a transmission from a given BTS may be calculated and used as a proxy for the sector size in the corresponding sector served by the BTS. The median path loss for transmissions from a given BTS may be calculated according to techniques now known in the art, or yet to be developed, without departing from the scope of the invention.

As illustrated, the method involves initially detecting that RC4 is available for resource allocation in a particular sector; as shown by block 202. Then, in response to detecting that RC4 is available, the BTS determines the location of each mobile station located in the sector, as shown by block 204. The BTS then uses the determined locations of the mobile stations in the sector as a basis to determine an amount by which to reduce power allocated for one or more overhead channels (i.e., "overhead-channel power") in the sector, as shown by block 206, and reduces the power allocated for the overhead channels by the determined amount, as shown by block 208.

The determined amount of overhead-channel power reduction may specify the amount of power reduction for each overhead channel. Alternatively, the determined amount may specify that total amount of power by which all overhead channels should be reduced, cumulatively. Accordingly, the power allocated for each overhead channel (e.g., each of the pilot, paging, and sync channels), may be reduced by a portion of the determined amount. The portion by which power is reduced may be equal for all overhead channels, or alternatively, may vary between overhead channels. As such, in a further aspect, the BTS may separately determine an amount by which to reduce the power allocated for each overhead channel. Further, the BTS may determine power reductions (and reduce power accordingly) for some overhead channels and not others (e.g., only the pilot channel, or the pilot channel and the sync channel, for instance).

In an exemplary embodiment, determining the amount by which to reduce overhead-channel power may involve determining a power level that maintains a sector size meeting certain requirements. In particular, since reducing the power of the overhead channels can effectively reduce the size of a sector, the BTS may require that the overhead-channel power not be reduced so much as to shrink the sector size (e.g., the distance or range from the serving BTS at which service is available) beyond a certain target size. For example, the BTS may require that the coverage of the sector not be reduced so much as to exclude the location of any mobile station, or alternatively, that the coverage of the sector not be reduced so much as to exclude the location of more than a certain number or certain percentage of mobile stations.

Figure 3A:
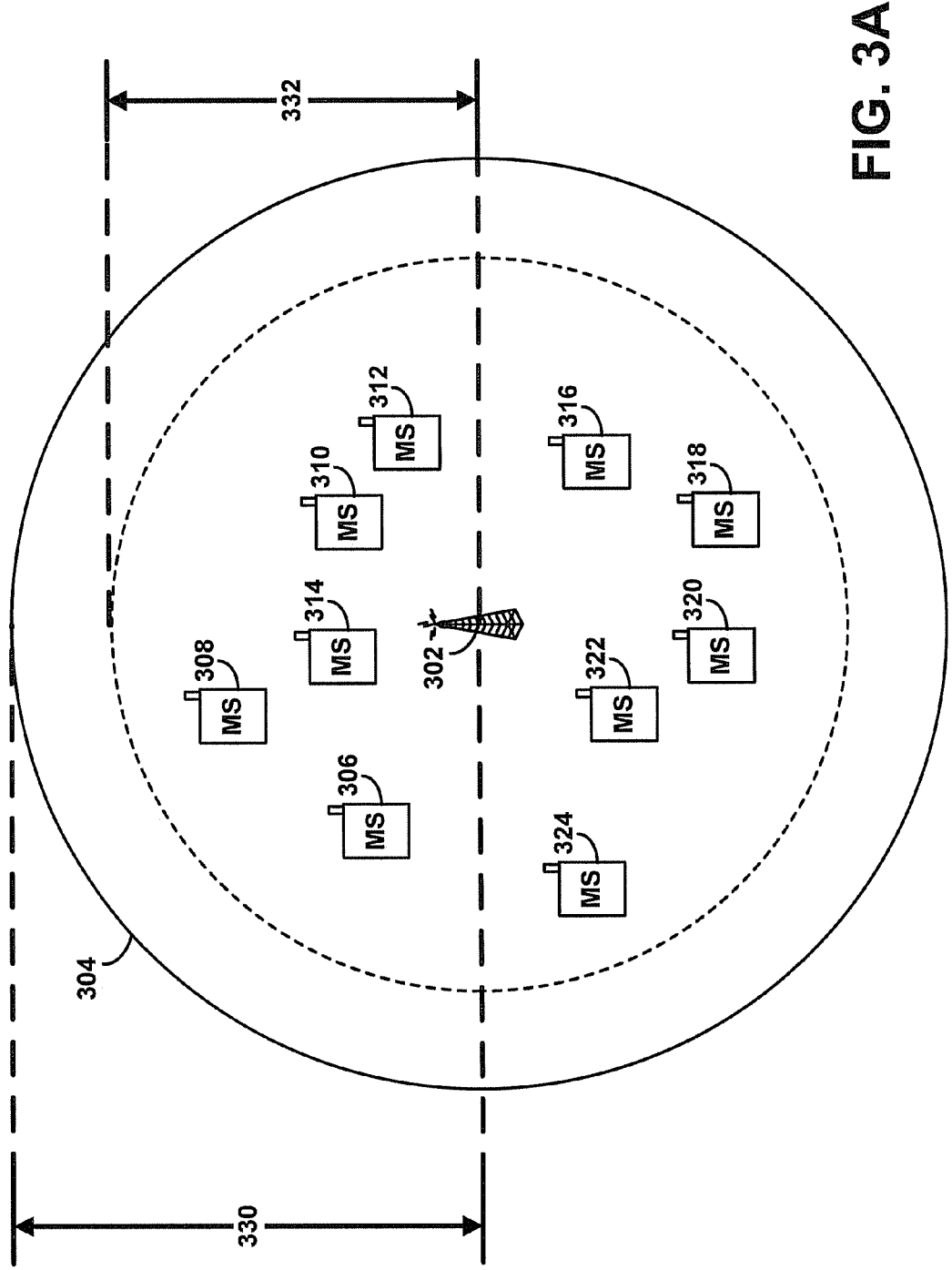
FIG. 3A is a block diagram illustrating an exemplary scenario in which an exemplary embodiment may be employed.

FIG. 3A illustrates a specific example in the scenario where BTS 302 provides service in sector 304 to mobile stations 306-324. The BTS 302 may first determine the location of each mobile station 306-324 in the sector 324, and then determine how far each mobile station 306-324 is from the BTS 302. Initially, the overhead channels are allocated power such that they are available at an average distance 330 from BTS 302, as shown in FIG. 3A. If the BTS 302 requires no mobile stations be excluded as the result of overhead-channel power reduction, the BTS 302 may determine an amount of power reduction that reduces the sector 324 to a size such that the overhead channels are available at an average distance 332 from the BTS. As shown, all mobile stations 306-324 remain within the sector after the coverage of the overhead channels is reduced to an average distance 332 (assuming they have not moved too far from their determined location).

Figure 3B:
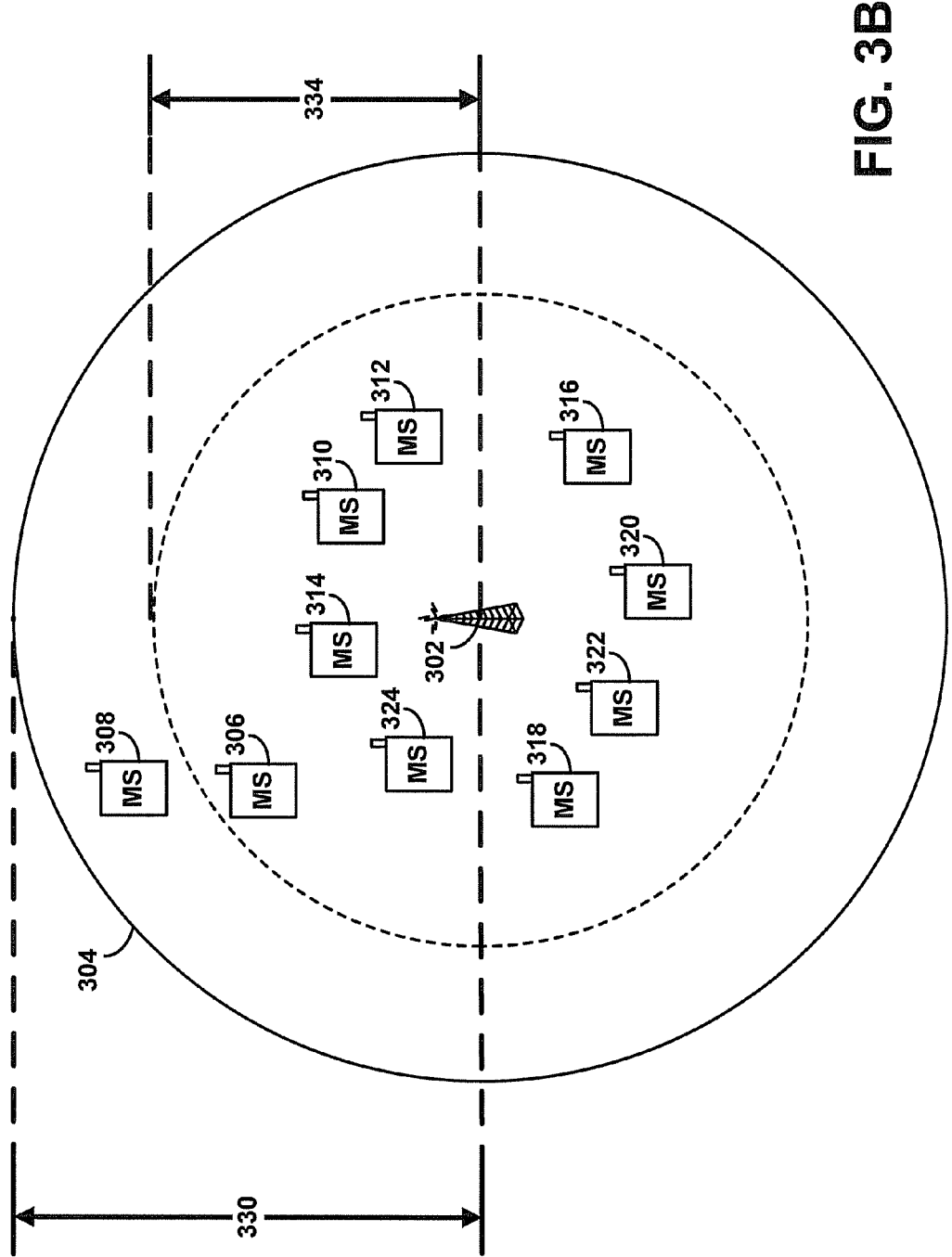
FIG. 3B is another block diagram illustrating an exemplary scenario in which an exemplary embodiment may be employed.

In a further aspect, the amount of power reduction may be such that the average distance 332 is greater than the distance between the furthest mobile station 324 and BTS 302, thus allowing the mobile stations to move some distance away from BTS without moving out of the sector. Alternatively, the amount of power reduction may be calculated so that the average distance 332 of coverage is equal to the distance between the furthest mobile station 324 and BTS 302. As yet another alternative, excluding some mobile stations may be acceptable. For instance, as shown in FIG. 3B, if ten percent may be excluded (e.g. one of the ten mobile stations 306-324), then the BTS 302 may calculate the power reduction such that the overhead channels are available at an average distance 334, which is less than the distance between the second furthest mobile station 306 and BTS 302. In practice, the power level corresponding to a particular sector size (or a particular average distance) may be determined using a commercial geographic information system (GIS) and traffic modeling tools, such as Ericsson, Inc.'s Planet EV, for instance. In particular, such tools can be used to determine the change in a sector's coverage as a result of decreasing the overhead channel power levels.

Figure 4:
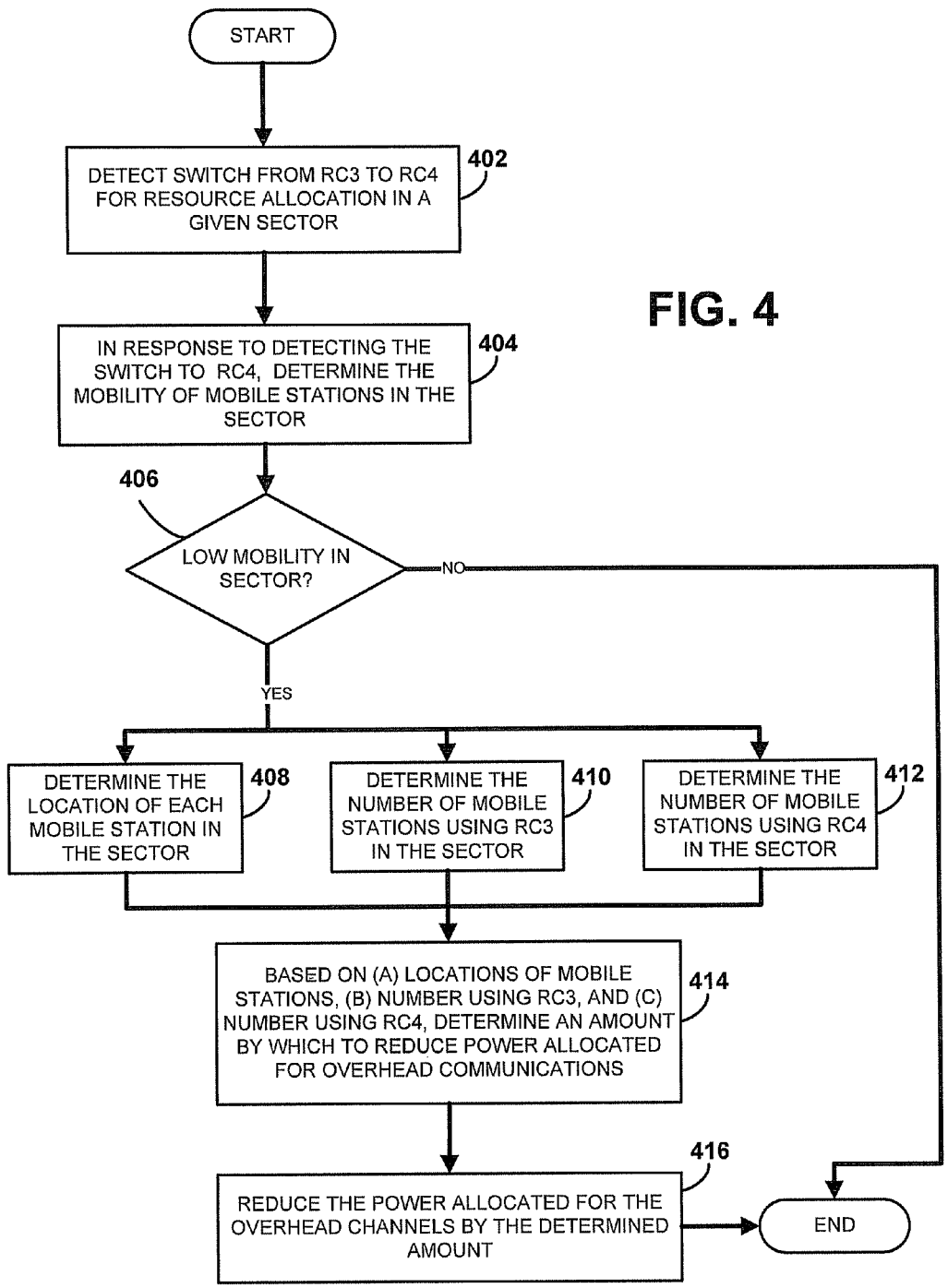
FIG. 4 is another flow chart illustrating a method for dynamically adjusting power allocated for overhead communications, according to an exemplary embodiment.

FIG. 4 is another flow chart illustrating a method for dynamically adjusting power allocated for overhead communications, according to an exemplary embodiment. FIG. 4 is similar to FIG. 3, but illustrates an embodiment where the redistribution of power between overhead channels and traffic channels is initiated upon a BTS switching from RC3 to RC4 for a particular sector, and is conditioned upon the determination that the sector is typically used by low-mobility mobile stations.

In particular, the BTS initially detects a switch from RC3 to RC4 for resource allocation in a given sector, as shown by block 402. In response to detecting the switch to RC4, the BTS evaluates whether or not it should reduce the amount of power allocated for overhead channels (and preferably re-allocate this power for traffic channels). Specifically, in response to detecting the switch, the BTS determines the mobility of mobile stations in the sector, as shown by block 404. The BTS then determines if the mobility in the sector is low (i.e., below a threshold level), as shown by block 406. Alternatively, it may be known, or may have been previously determined, that a sector characteristically has low-mobility users. In such sectors (e.g., sectors serving a sporting venue, college campus, etc., where users often remain at or near the same location for extended periods), the BTS may skip the step of determining the mobility in the sector, and automatically proceed to adjust overhead-channel power whenever it switches to RC4.

If the sector has low-mobility traffic, then the BTS initiates a process to reduce the power allocated for overhead communications. Specifically, in the illustrated embodiment, the BTS determines the location of each mobile station located in the sector, as shown by block 408. Further, the BTS determines the number of mobile stations in the sector that are using RC3, and the number that are using RC4, as shown by blocks 410 and 412, respectively. Then, based on (a) the location of the mobile stations in the sector, (b) the number of mobile stations that connected using RC3, and (c) the number that are using RC4, the BTS determines an amount by which to reduce the power allocated for overhead communications in the sector, as shown by block 414. The BTS then proceeds to reduce the power allocated to overhead channels in the sector by the determined amount, as shown by block 416.

To detect a switch from RC3 to RC4 in a given sector, the BTS may monitor which radio configuration it is using for new connections in the sector (e.g., to assign Walsh codes). It should be understood that the switch to RC4 may be detected in advance of the switch (e.g., by the BTS recognizing that conditions exist that will soon lead to a switch to RC4), upon initiation of the switch, during the process of switching, or shortly after the switch. Further, the method may be implemented and/or repeated periodically while RC4 is in use for resource allocation, thus allowing for dynamic adjustment to the distribution of power between overhead channels and traffic channels. In the event that the method is additionally or alternatively implemented by one or more other entities besides a BTS, the other entity or entities may be sent a message from a BTS that indicates when a switch from RC3 to RC4 is about to occur, is occurring, or has just occurred.

Generally, to determine the mobility in a sector, the BTS may determine the percentage of mobile stations that remain in a sector, or remain within a predetermined distance from the BTS serving the sector, during a mobility evaluation period. Specifically, at a beginning of the mobility evaluation period, the BTS may determine which mobile stations are located in the sector. Further, at the beginning of the mobility evaluation period, the BTS may determine the location of each mobile station and its distance from the BTS. Then, at the end of the mobility evaluation period, the BTS may determine the percentage of the mobile stations that were located in the sector at the beginning of a mobility evaluation period, that remain located in the sector (or the percentage that remain within the predetermined distance from the BTS).

Figure 5A:
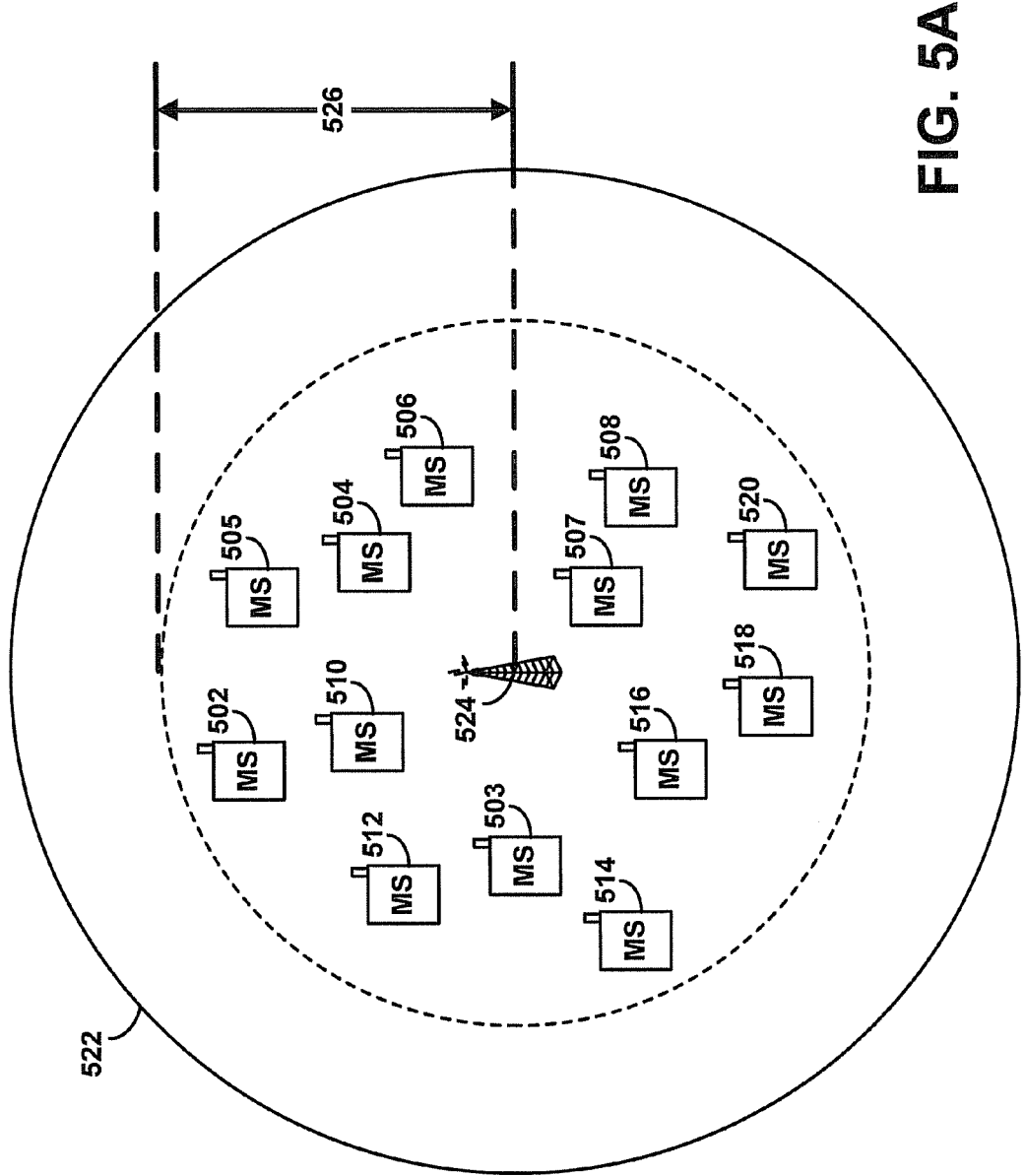
FIG. 5A is another block diagram illustrating an exemplary scenario in which an exemplary embodiment may be employed.

FIGS. 5A and 5B are block diagrams illustrating the locations of mobile stations 502-520 at the beginning and end of a mobility evaluation period, respectively. As shown in FIG. 5A, at the beginning of the mobility evaluation period, mobile stations 502-520 are located in sector 522, which is served by BTS 524. Accordingly, the BTS 524 determines the geographic location (e.g., latitude-longitude or GPS coordinates) of each mobile station 502-520 it is serving (e.g., such as by querying a position determining system or using any other appropriate technique). The BTS 524 then determines which mobile stations are located within a predetermined distance 526 (referred to as the "evaluation distance") from the location of the BTS. In FIG. 5A, all mobile stations 502-520 are located within the evaluation distance 526 from BTS 524. Then, at the end of the mobility evaluation period, the BTS 524 again determines the geographic location of mobile stations 502-520 (or possibly just 502, 504, 506, and 508-520), determines how far each mobile station is from BTS 524, and determines whether each mobile station is still within the evaluation distance 526 from BTS 524.

As shown in FIG. 5B, mobile station 503 has now moved more than the predetermined distance 526 from BTS 524. Accordingly, BTS determines that approximately 91% of mobile stations remain within the predetermined distance 526 from BTS 524 at the end of the mobility evaluation period. If, for example, the threshold percentage of mobile stations remaining within the evaluation distance is 90%, then the BTS determines that more than the threshold percentage of mobile stations remain within the predetermined distance 526, and accordingly, determines that sector 522 is a low-mobility sector (i.e., sector 522 is currently serving low-mobility users). If this were not the case—if the threshold percentage were 95%, for instance—then the BTS would refrain from adjusting the overhead-channel power.

Referring again to FIG. 4, once it is determined that mobile stations in a sector are typically of low mobility, the BTS may use the locations of the mobile stations, along with the user distribution between the different types of resource allocation (e.g., the number of mobile stations using RC3 and RC4, respectively), to determine the amount by which to reduce overhead-channel power levels. It should be understood that the locations determined when evaluating mobility, may also be used to determine the amount by which to reduce overhead-channel power. Alternatively, the BTS may again determine the locations of the mobile stations in the sector, in order to determine the amount of power reduction.

Figure 6:
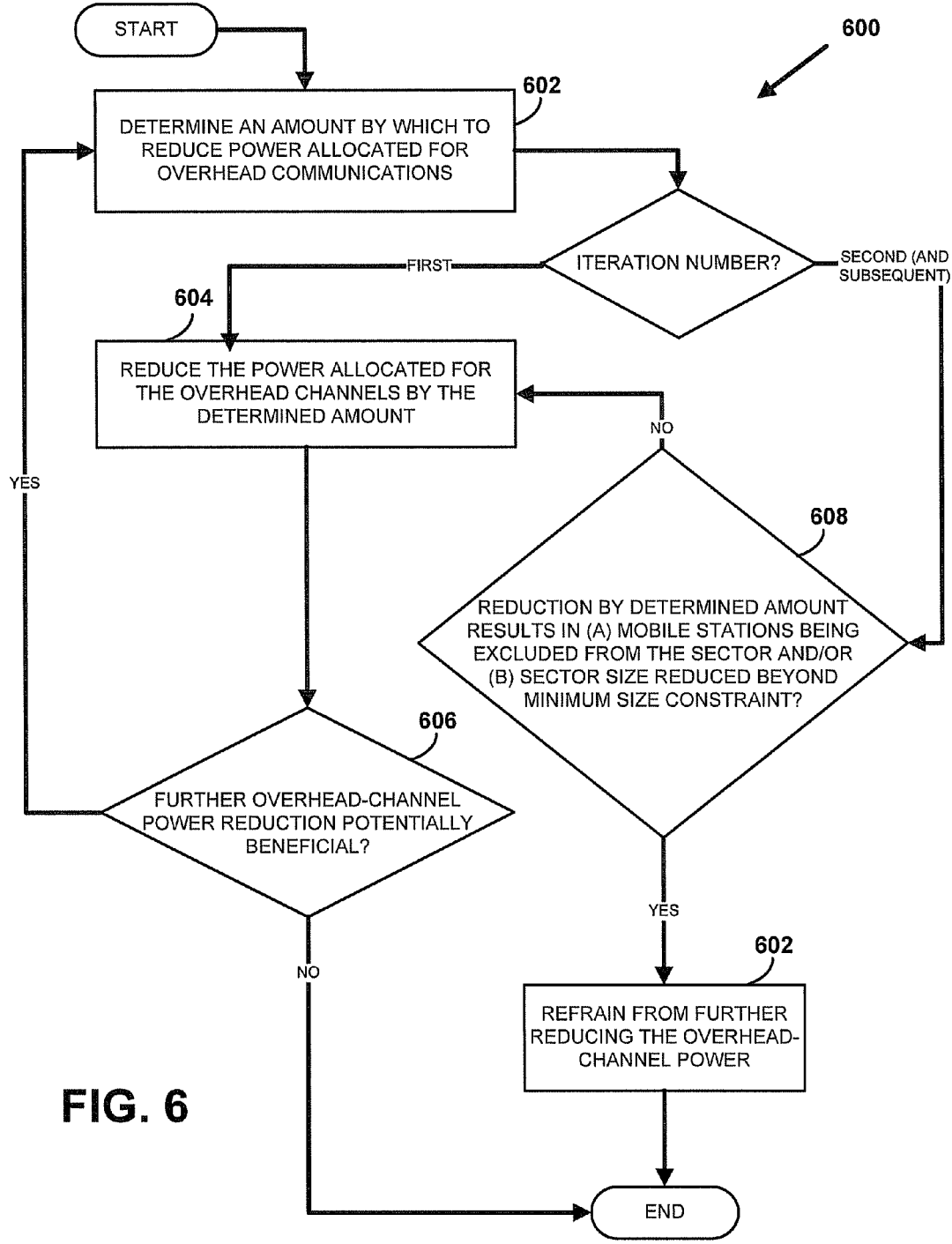
FIG. 6 is another flow chart illustrating a method for dynamically reducing the power allocated for overhead communications, according to an exemplary embodiment.

FIG. 6 is another flow chart illustrating a method 600 for dynamically reducing the power allocated for overhead communications, according to an exemplary embodiment. Method 600 functions similarly to blocks 408-416 in FIG. 4, but illustrates an embodiment where the power allocated for overhead communications is reduced incrementally. Like other exemplary methods, the method 600 (a) may be initiated in response to detecting a particular radio configuration is available (such as RC4), detecting a switch from RC3 to RC4, and/or detecting an RC3/4 selection process in a sector, and/or (b) may be conditioned upon a determination that the mobility of mobile stations in a sector is below a threshold mobility.

According to method 600, the BTS iteratively reduces the power in increments by repeating blocks 602-604 until the overhead-channel power cannot be reduced without excluding mobile stations located in the sector or shrinking the sector past a predetermined minimum size constraint. More specifically, in the first iteration, the BTS may determine an amount by which to reduce power allocated for one or more overhead channels, as shown by block 602 (using a technique such as that illustrated by block 408-414, for example). The BTS then reduces overhead power by the determined amount, as shown by block 604. The BTS then optionally determines whether further reduction in overhead-channel power would potentially be beneficial (i.e., whether allocating more power for traffic channels could potentially improve quality-of-service experienced by mobile stations in the sector), as shown by block 606. If it would be beneficial, then the BTS again calculates an amount by which to reduce the power allocated for overhead, as shown by repetition of block 602.

Further, in the second iteration of the overhead-power reduction process (and preferably any subsequent iterations), the BTS may determine whether reducing overhead power by the determined amount would result in (a) one or more mobile stations being excluded from the sector and/or (b) the size of the sector being reduced beyond a predetermined minimum size constraint, as shown by block 608. If mobile stations would be excluded (or possibly, if more than a predetermined number or percentage would be excluded), then the BTS refrains from further reducing the overhead-channel power (i.e., does not reduce the overhead-channel power by the amount determined in the current iteration of block 602), as shown by block 610. Otherwise, the BTS proceeds to reduce the overhead power by the determined amount, as shown by the repetition of block 604.

As a specific example, based on the link budget in a given sector, 2 watts may be allocated for the pilot channel, 0.8 watts may be allocated for the paging channel, and 0.2 watts may be allocated for the sync channel, which results in total overhead channel power of 3 watts. Using a GIS or another suitable technique, it may be determined that the 3 watts of total overhead channel power results in an average coverage distance of, for example, ten miles (i.e., that coverage distance, accounting for a median path loss, is ten miles). Further, at this time, 25 RC3 connections may be open in this sector (implying that 50 RC4 Walsh Codes are unavailable) and thus theoretically has 78 RC4 available. However, because of power limitations, incoming calls may be blocked once the BTS assigns 45 RC4 codes, despite the availability of 33 more RC4 Walsh codes. Thus, according to an exemplary method, the RAN may determine that the size of the sector can be reduced by as much as two miles (i.e., that the critical coverage distance is eight miles). Further, overhead power may be reduced in 0.2 watt increments, and it may be determined that with the initial 0.2 watt reduction, the average coverage distance is reduced to 9.34 miles, for example. Accordingly, the power will be reduced in 0.2 watt increments, until it can no longer be reduced without the average coverage distance being reduced to less than the critical distance of eight miles.

The step of determining whether further reduction in overhead-channel power would be beneficial may involve the BTS serving a sector determining whether there is a high probability of new calls being blocked due to power limitation while Walsh codes are still available. In particular, BTSs are typically configured to be aware of the total power allocated for overhead and traffic channels, as well as the total number of calls supported currently on both RC3 and RC4. Based on the total power allocated for traffic channels and the number of current RC3 and RC4 calls the BTS may determine how many more new calls can be provided (if any). Then, if RC4 Walsh codes are still available, but it is determined that there is a high probability that new calls will be blocked due to power limitations, the BTS may decide that further reduction in overhead-channel power is beneficial.

It should be understood that determining whether further reduction in overhead-channel power would be beneficial is optional. As such, the BTS may omit this step on some or all iterations of the method 600, and proceed to perform block 602, block 608, and block 604, until it is determined that the sector size should not be further reduced. It should also be understood that checking whether mobile stations would be excluded is also optional. Accordingly, the method may involve incrementally reducing the power allocated for overhead communications until the predetermined minimum size constraint is reached.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. In a radio access network (RAN), a method for dynamically adjusting power allocated for overhead communications, the method comprising:

in a sector of the RAN where a base transceiver station (BTS) serving the sector is configured to provide service using either radio configuration 3 (RC3) or radio configuration 4 (RC4), detecting an initiation of a process that selects between RC3 and RC4 for new calls, wherein an amount of power is initially allocated for overhead communications in the sector; and in response to detecting the initiation of the process that selects between RC3 and RC4:
- (a) determining the location of each of one or more access terminals located in the sector;
- (b) using the determined locations of the access terminals as a basis for determining an amount by which to reduce the power allocated for overhead communications in the sector; and
- (c) reducing the power allocated for overhead communications by the determined amount.

2. In a radio access network (RAN), a method for dynamically adjusting power allocated for overhead communications, the method comprising:
detecting a switch to RC4 for resource allocation in a given sector of the RAN, wherein an amount of power is initially allocated for overhead communications in the sector;
in response to detecting the switch to RC4:
- (a) determining the location of each of one or more access terminals located in the sector; and
- (b) based at least in part on the determined locations of the access terminals, determining mobility of access terminals in a given sector of the RAN;
making a determination as to whether or not the determined mobility of access terminals in the sector is below a threshold level;
if the determined mobility is below the threshold level, then:
- (c) determining an amount by which to reduce the power allocated for overhead communications in the sector; and
- (d) reducing the power allocated for overhead communications by the determined amount; and
if the determined mobility is not below the threshold level, then refraining from reducing the power allocated for overhead communications.

3. In a radio access network (RAN), a system configured to dynamically adjust power allocated for overhead communications, the system comprising:
a communication interface;
at least one processor;
program logic stored in data storage and executable by the at least one processor to:
- (a) operate the communication interface;
- (b) detect that a particular radio configuration is available for use in a given sector of the RAN, wherein an amount of power is initially allocated for overhead communications in the sector;
- (c) when the particular radio configuration is detected as available for use, determine the location of each of one or more access terminals located in the sector;
- (d) use the determined locations of the access terminals in the sector as a basis to determine an amount by which to reduce the power allocated for overhead communications in the sector; and
- (e) reduce the power allocated for overhead communications by the determined amount.

4. The system of claim 3, wherein the communication interface is configured to communicate with a position determining system, and wherein the position determining system is configured to determine locations of access terminals.

5. The system of claim 3, wherein the system further comprises program logic stored in data storage and executable by the at least one processor to:
- (i) determine mobility of access terminals in the sector during a mobility evaluation period;
- (ii) make a determination as to whether or not the mobility of access terminals in the sector is below a threshold level; and
- (iii) condition performance of (c)-(e) upon a determination that the mobility of access terminals in the sector is below the threshold level.

6. The system of claim 5, wherein the program logic executable to determine mobility of access terminals in the sector during the mobility evaluation period comprises program logic executable to:
at a beginning of a mobility evaluation period, determine which access terminals are located within a first distance from a BTS serving the sector;
at an end of the mobility evaluation period, determine a percentage of the access terminals that were located within the first distance from the BTS at the beginning of the mobility evaluation period, which remain located within the first distance from the BTS at the end of the mobility evaluation period.

7. The system of claim 5, wherein the program logic executable to condition performance of (c)-(e) upon a determination that the mobility of access terminals in the sector is below the threshold level comprises program logic executable to:
condition performance of (c)-(e) upon a determination that the percentage of the access terminals that remain located within the first distance from the BTS at the end of the mobility evaluation period is greater than a threshold percentage.

8. The system of claim 7, wherein the threshold percentage is substantially within the range of 85 percent to 90 percent.

9. The system of claim 3, wherein the program logic is further executable to, after performing (e):
determine whether or not an allocation of additional power for user traffic in the sector would improve quality-of-service in the sector; and
if it is determined that an allocation of additional power for user traffic in the sector would improve quality-of-service in the sector, then repeat (d)-(e).

10. The system of claim 3, wherein the program logic is further executable to, after performing (e):
determine whether or not repeating (d) would result in size of the sector being reduced to an extent such that the location of a predetermined amount of access terminals would be outside of the sector; and
if it is determined that less than the predetermined amount of access terminals would be outside the sector, then repeat steps (d)-(e).

11. In a radio access network (RAN), a method for dynamically adjusting power allocated for overhead communications, the method comprising:
in a sector of the RAN wherein a base transceiver station (BTS) serving the sector is configured to provide service using either radio configuration 3 (RC3) or radio configuration 4 (RC4), wherein RC3 is initially available to use for resource allocation, and wherein an amount of power is initially allocated for overhead communications in the sector, detecting a switch from RC3 to RC4 for resource allocation; and
in response to detecting the switch from RC3 to RC4 for resource allocation:
- (a) determining the location of each of one or more access terminals located in the sector;
- (b) using the determined locations of the access terminals as a basis for determining an amount by which to reduce the power allocated for overhead communications in the sector; and (c) reducing the power allocated for overhead communications by the determined amount.

12. In a radio access network (RAN), a method for dynamically adjusting power allocated for overhead communications, the method comprising:
   in a sector of the RAN wherein a base transceiver station (BTS) serving the sector is configured to provide service using either radio configuration 3 (RC3) or radio configuration 4 (RC4), detecting that a particular radio configuration is available for use in the sector, wherein an amount of power is initially allocated for overhead communications in the sector;
   in response to detecting that the particular radio configuration is available for use:
      (a) determining the location of each of one or more access terminals located in the sector;
      (b) determining a number of access terminals located in the sector that are using RC3 for resource allocation;
      (c) determining a number of access terminals located in the sector that are using RC4 for resource allocation;
      (d) using: (i) the determined locations of the access terminals, (ii) the number of access terminals assigned that are using RC3, and (iii) the number of access terminals that are using RC4 as bases for determining an amount by which to reduce the power allocated for overhead communications in the sector; and
      (e) reducing the power allocated for overhead communications by the determined amount.

13. In a radio access network (RAN), a method for dynamically adjusting power allocated for overhead communications, the method comprising:
   detecting that a particular radio configuration is available for use in a given sector of the RAN, wherein an amount of power is initially allocated for overhead communications in the sector;
   in response to detecting that the particular radio configuration is available for use:
      (a) determining the location of each of one or more access terminals located in the sector;
      (b) using the determined locations of the access terminals as a basis to determine a target size for the sector;
      (c) determining an amount by which overhead-channel power in the sector can be reduced while maintaining a sector size of the sector that is greater than the target size
      (d) determining an amount by which to reduce the power allocated for overhead communications in the sector, wherein the amount by which to reduce the power allocated for overhead communications is less than or equal to the amount by which overhead-channel power in the sector can be reduced; and
      (e) reducing the power allocated for overhead communications by the determined amount.

14. The method of claim 13, wherein using the determined locations of the access terminals as a basis to determine a target size for the sector comprises using a position determining system to determine an average distance from BTS that includes a predetermined percentage of the access terminals.

15. In a radio access network (RAN), a method for dynamically adjusting power allocated for overhead communications, the method comprising:
   detecting that a particular radio configuration is available for use in a given sector of the RAN, wherein an amount of power is initially allocated for overhead communications in the sector;
   in response to detecting that the particular radio configuration is available for use, determining mobility of access terminals in a given sector of the RAN during a mobility evaluation period;
   making a determination as to whether or not the determined mobility of access terminals in the sector is below a threshold level;
   if the mobility of access terminals in the sector is below the threshold level, then:
      (a) determining the location of each of one or more access terminals located in the sector;
      (b) using the determined locations of the access terminals as a basis for determining an amount by which to reduce the power allocated for overhead communications in the sector; and
      (c) reducing the power allocated for overhead communications by the determined amount; and
   otherwise, refraining from performing steps (a) through (c).

16. The method of claim of claim 15, wherein determining the mobility of access terminals in a given sector of the RAN during a mobility evaluation period comprises:
   at a beginning of a mobility evaluation period, determining which access terminals are located in the sector;
   at an end of the mobility evaluation period, determining a percentage of the access terminals that were located in the sector at the beginning of the mobility evaluation period, which remain located in the sector at the end of the mobility evaluation period.

17. The method of claim of claim 16, wherein determining the mobility of access terminals in a given sector of the RAN during a mobility evaluation period comprises:
   at a beginning of a mobility evaluation period, determining which access terminals are located within a first distance from a BTS serving the sector;
   at an end of the mobility evaluation period, determining a percentage of the access terminals that were located within the first distance from the BTS at the beginning of the mobility evaluation period, which remain located within the first distance from the BTS at the end of the mobility evaluation period.

18. The method of claim 17, wherein making a determination as to whether or not the determined mobility of access terminals in the sector is below a threshold level comprises making a determination that the percentage of the access terminals that remain located within the first distance from the BTS at the end of the mobility evaluation period is greater than a threshold percentage.

\* \* \* \* \*